Feb. 12, 1957 H. NOLD 2,781,097
MANUFACTURING SMALL-HOLE SIEVES
Filed Aug. 7, 1951 7 Sheets-Sheet 1
FIG.1
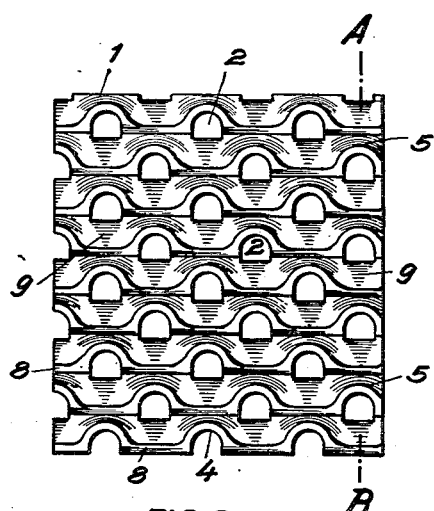
FIG.2 SECTION A-B
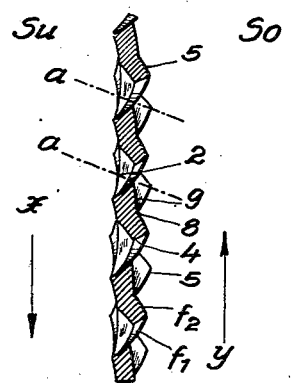
FIG.3
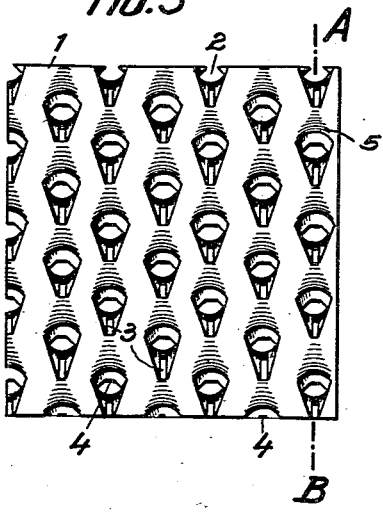
FIG.4 SECTION A-B
INVENTOR
HANS NOLD
BY [signature]
ATTORNEY

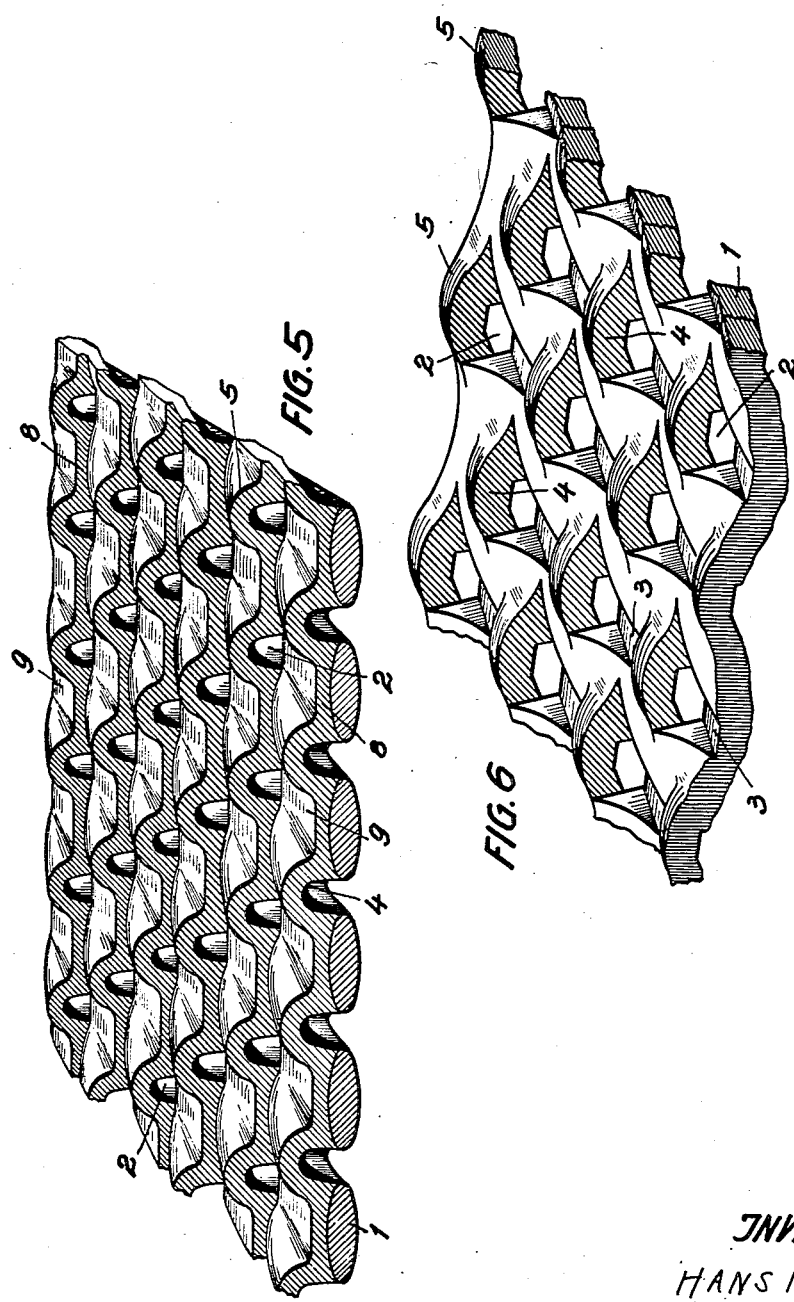

Feb. 12, 1957     H. NOLD     2,781,097
MANUFACTURING SMALL-HOLE SIEVES

Filed Aug. 7, 1951     7 Sheets-Sheet 3

INVENTOR
HANS NOLD
BY
ATTORNEY.

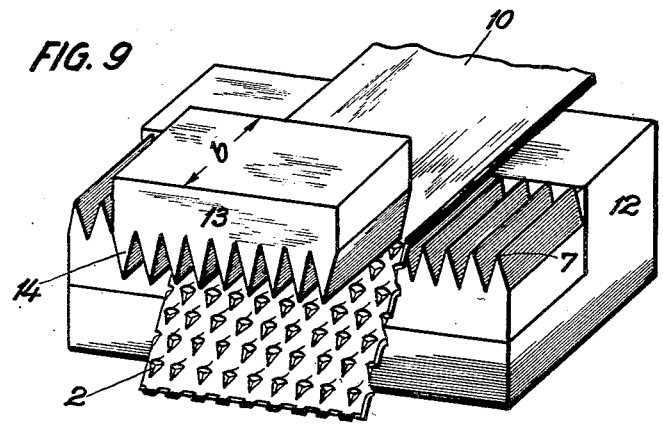
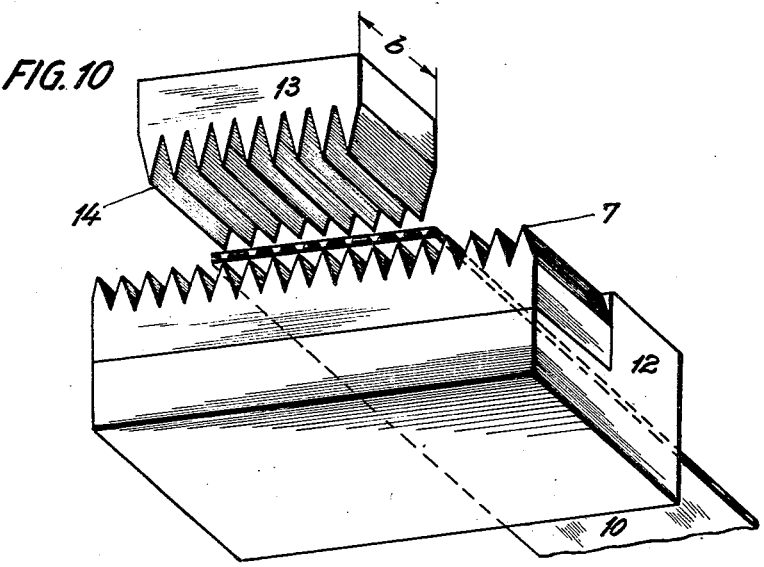

Feb. 12, 1957 H. NOLD 2,781,097
MANUFACTURING SMALL-HOLE SIEVES
Filed Aug. 7, 1951 7 Sheets-Sheet 5
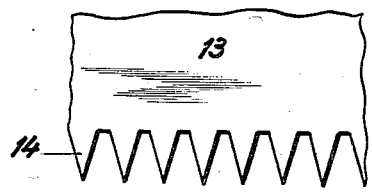
FIG. 11
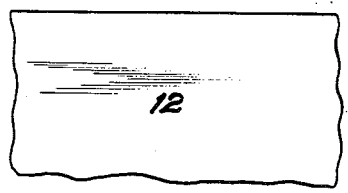
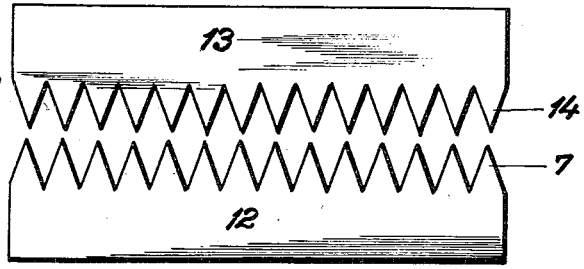
FIG. 12
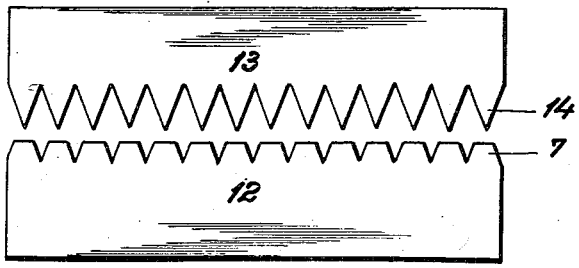
FIG. 13
INVENTOR
HANS NOLD
BY Leo L. Townsend
ATTORNEY.

Feb. 12, 1957 H. NOLD 2,781,097
MANUFACTURING SMALL-HOLE SIEVES
Filed Aug. 7, 1951 7 Sheets-Sheet 6
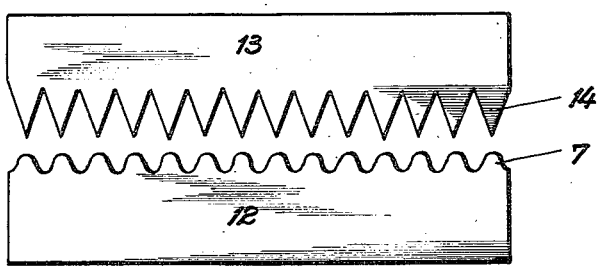
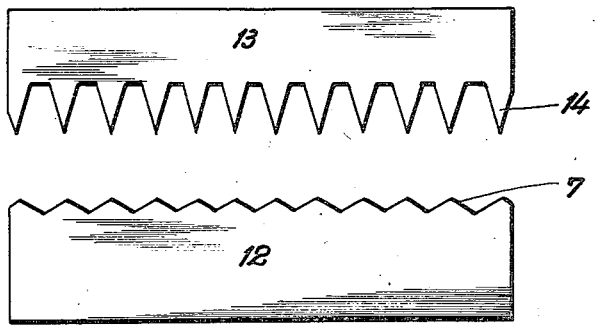
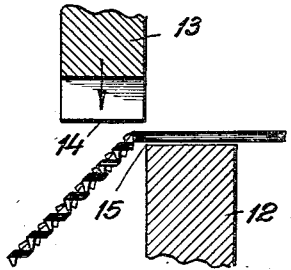
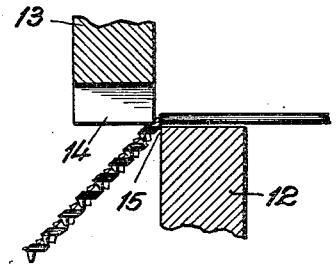
INVENTOR
HANS NOLD
BY Leo F. Bundy
ATTORNEY Feb. 12, 1957 H. NOLD 2,781,097
MANUFACTURING SMALL-HOLE SIEVES
Filed Aug. 7, 1951 7 Sheets-Sheet 7

INVENTOR
HANS NOLD
BY
ATTORNEY:

United States Patent Office 2,781,097
Patented Feb. 12, 1957

---

2,781,097

MANUFACTURING SMALL-HOLE SIEVES

Hans Nold, Stockstadt (Rhine), Germany, assignor to Extraction & Chemical Company, Inc., New York, N. Y.

Application August 7, 1951, Serial No. 240,719

Public Law 619, August 23, 1954
Patent expires January 30, 1970

3 Claims. (Cl. 164—125)

This invention relates to a method of producing small-hole sieves from sheet metal of a diameter up to 1.5 mm. The method consists in forming small holes in closely spaced parallel rows across the metal sheet with axes extending oblique-angled to the plane of the sheet and with cam-like beads on one side of the bottom of the sheet.

A further object of the invention is to produce sieves of this character that have as many apertures of a small cross section as possible per surface area without affecting the strength of the sieve bottom.

These and other objects of the present invention will appear as the following description thereof proceeds, and in order to more clearly understand the invention, reference may be made to the accompanying drawings in which:

Fig. 1 is a top plan view of a section of a small-hole sieve made in accordance with this invention;

Fig. 2 is a section on the line A—B of Fig. 1;

Fig. 3 is a top plan view of a section of a small-hole sieve made in accordance with this invention wherein cam-like embossments are provided on both sides of the sieve holes;

Fig. 4 is a section on the line A—B of Fig. 3;

Fig. 5 is an enlarged perspective, partly in section of a sieve made in accordance with Fig. 1;

Fig. 6 is an enlarged perspective, partly in section, of a sieve made in accordance with Fig. 3;

Figs. 9 and 10 are oblique perspectives from above and below of the method of manufacturing a sieve from a blank with two sets of die teeth, the sheet being cut off at the lower die edge in Fig. 10;

Fig. 11 shows a single set of teeth for forming the holes;

Figs. 12, 13, 14 and 15 show double sets of teeth for forming the holes;

Figs. 16 and 17 show the penetrating steps for forming the perforations;

Figure 7:
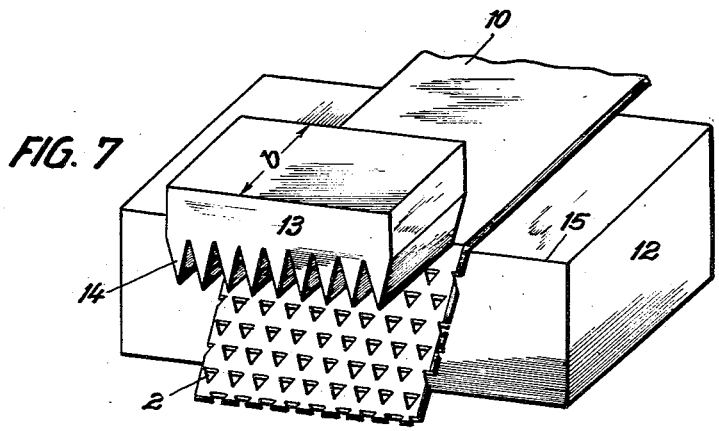
Figs. 7 and 8 are oblique perspectives from above and below of the methods of manufacturing a sieve from a sheet with one set of die teeth, the sheet being cut off at the block edge in Fig. 8.

Small-hole sieves belong to the category of perforated metals. In the past they were produced by punching out the apertures by means of a die. In some cases the apertures were also drilled. Sieves of this kind are chiefly used for screening powdery materials. The continual progress in the art of engineering and especially the constantly increasing requirements concerning the dressing of raw materials and the grading of powdery finished products has intensified the demand for finer grading, particularly in the field of crushing hard materials in beater mills, centrifuges, and other special machines.

In order to cope with these increasing requirements, fine-meshed wire cloth, for example, was placed between coarse-hole plates. Apart from short life, the results obtained therefrom were rather poor. With a view to achieving finer grading, therefore, the development of perforated plates was continued. In connection with the technique applied to making the holes, it was found that the increasing degree of finer perforations was in conformity with the reduction of the thickness of the metal, and this development was continued until the approximate ratio: diameter of hole equals the thickness of sheet metal, as achieved. Another progress was made by punching taper holes. With a pitch of holes of 1.5 mm. and a thickness of sheet metal of 0.75 mm., hole diameters down to 0.25 mm. were thus obtained. Using this working method the shape of hole is inaccurate since the burr caused by the counter-pressure of the base of the tool when punching the hole, is pushed back into the hole. This favours clogging of the holes. The percentage of open screening area in the case of the taper type of perforation is small.

Lately, perforated sieves with the utmost degree of fineness are also made by a chemical or photo-galvanical process. In this connection, however, only special types of metal can be used, which are unsuitable for many purposes. Besides, on account of their high price these sieve bottoms can only be used for special functions.

The apertures of the sheet metal used for fine screening consist in the case of those constructions that have become known, of circular holes whose axis stands vertically to the sieve plane. The same applies to the punched taper holes. The edges of the holes lie in the plane of the sheet metal, so that the sieve bottom forms a smooth surface. Small-hole sieves of this type, i. e. with the hole axis standing vertically to the sieve plane, have the disadvantage that the material to be screened, especially in the case of rotary sieves, slides over the small apertures and is apt to clog them. The screening result is relatively poor and wear and tear correspondingly greater, since the material to be screened up to the time screening is completed, acts for a greater length of time on the sieve bottom than in the case of rapid screening. The life of such sieve bottoms is also reduced by the fact that the edges of the apertures are not protected.

By the present invention a method for making a perforated sieve and devices for carrying out the process of fine screening are created. Perforated sieves of this type have as many apertures of a small cross section as possible per surface area (large open screening area) without affecting the strength of the sieve bottom, and at the same time afford the possibility of adapting the screening apertures to the direction of movement of the material to be screened, according to technical requirements, on the one hand, whilst the sieve bottom proper, on the other hand, can be used for dressing, as, for instance, for crushing.

In accordance with this invention, the axes of the screening holes are arranged oblique-angled, i. e. inclined or sloping to the sieve plane, and in the case of circular curved sieves in a chordal direction, i. e. not radial. The oblique position opens several new aspects of technically favorable screening uses. If, for example, the axis of the oblique apertures is led against the movement of the material to be screened, this arrangement already alone will improve the screening results. The passage of the material through the oblique aperture is facilitated. This success is especially achieved in the case of rotary sieves.

An additional characteristic of the present invention is the embossed edge of the hole on the feeding side of the sieve bottom. This kind of shaping which it has been found expedient to provide half-sided on the oblique hole, is so arranged that it counteracts the direction of movement of the material to be screened, i. e. it captures the material and guides it towards the oblique aperture. The best success is obtained if this kind of shaping surrounds the one side of the hole ridge-like or cam-like and if every hole is provided with such a ridge or cam. These ridges which, for instance, in the case of rotary sieves are moved against the material to be screened, exercise a shovel-like effect and force the material towards the apertures. At the same time they have a powerful effect on the material, support crushing and increase the screening effect.

In the finished product the apertures 2 with the assumed axes $a$ are provided in a piece of sheet metal 1 by the method to be hereinafter described. The sheet metal is curved on the edges of the holes, and with each hole forms a semi-sided ridge or cam 5. The feeding side of the sieve bottom is marked $So$ and its screening side $Su$. The ridges or cams 5 on the feeding side have steep flanks $f2$ and flattened flanks $f1$, and if required also vice versa. The faces 4 of the ridges change over into the transverse stage 8, which extends rectilineal over the width of the sieve and is interrupted by the apertures 2. In front of each aperture 2 there is a plane surface 9 which slightly rises towards the preceding stage 8. The direction of movement of the sieve bottom is marked X, whilst Y indicates the direction of movement of the material to be screened.

The sieve, according to Fig. 5, is a greatly enlarged perspective view of a sieve with the characteristics of Figures 1 and 2. This is a sieve embossed on one side with the transversal stage 8 connecting the faces 4 of the embossments 5, whilst there is a rising surface 9 in front of each hole.

The sieve, according to Fig. 6, is a greatly enlarged perspective view of a double sided embossed sieve with the embossments 5, the faces 4, and the groove-like recess 3 shown in Fig. 6.

Figure 18:
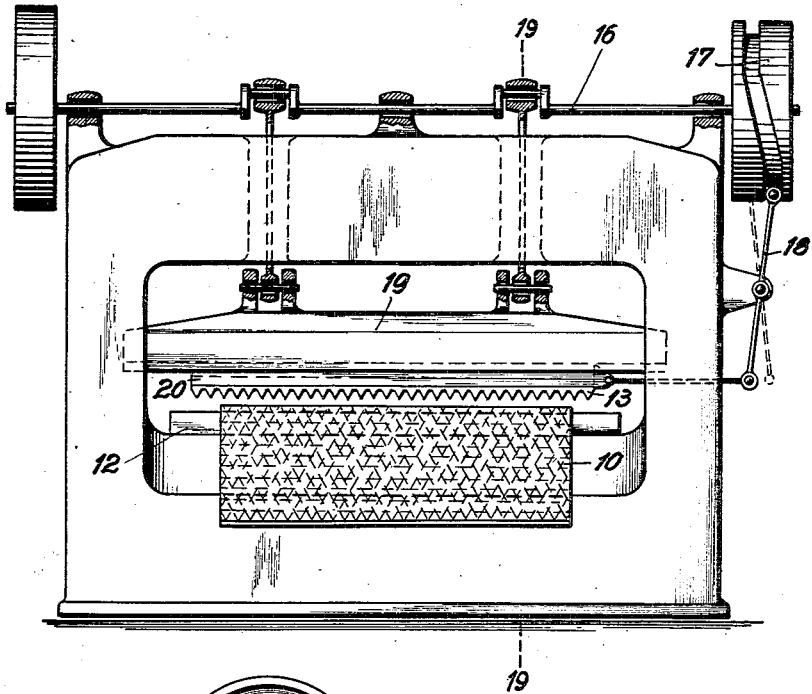
Fig. 18 is a front elevation of a machine for forming the holes.
Figure 19:
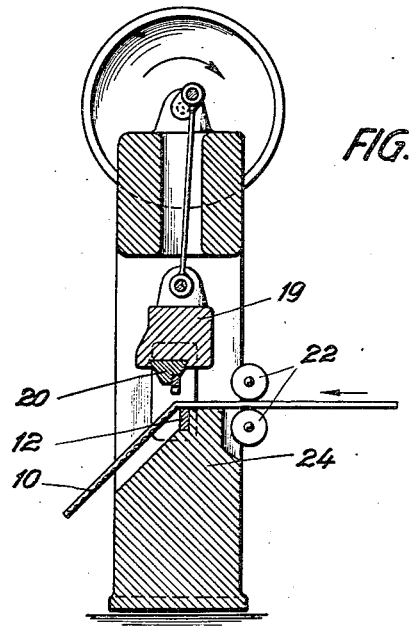
Fig. 19 is a vertical section thereof on the line 19—19 of Fig. 18.

The machine in which the toothed tools are built in for forming the holes and for stamping, in conformity with the present invention, is shown in diagram in Figures 18 and 19. The beam 19 of the press is provided with an up and down movement by crankshaft 16. The rack support 20 in the press is so arranged that it can slide. Rack 13 is bolted to it. The rack support 20 obtains its to and fro-movement for the purpose of staggering the rows of holes, from a cam 17 on the crankshaft 16. This is connected by a rocking lever 18 and suitable linkage to rack support 20. With each stroke of the beam 19, the rack is shifted, so that the following row of holes is staggered to the previously formed row of holes. The sheet metal 10 is advanced in successive steps by feed rollers 22 the distance of the rows of holes from each other, and is held fast at the moment when perforation takes place. Block 12 is fastened in the lower part of the press 24. In connection with this example the block is not toothed but is plain for the purpose of single sided cam formation. However, it may be formed with teeth 7 as shown in Figs. 9 and 10.

Figure 8:
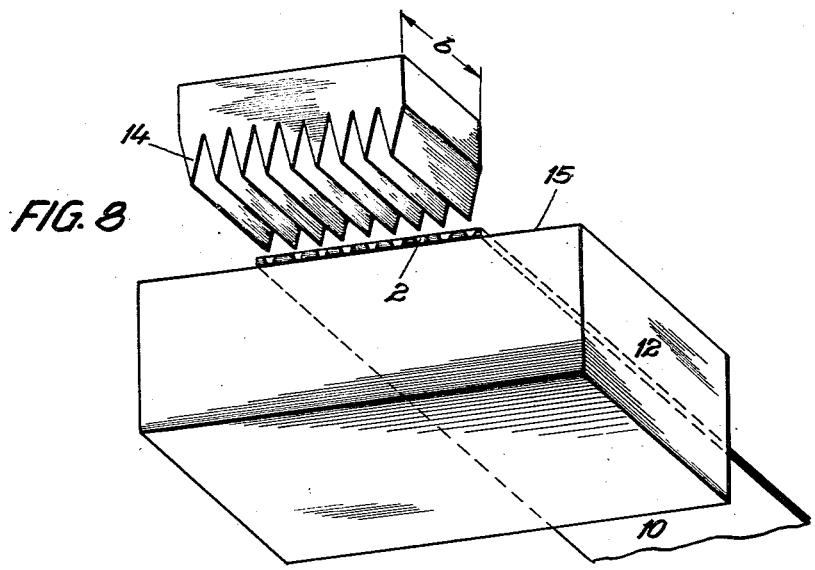

The flattened metal strip 10 of Figures 7, 8, 9, and 10 whose width depends on the working width of the machine is placed in the press on block 12 of Figs. 7 and 8, and is fed intermittently according to the spacing of the rows of holes by means of an arrangement not illustrated. It stands still at the moment perforation takes place. Tool 13 consists of a steel bar in which teeth 14 are formed. It is desirable that the extreme tips of the teeth are rounded off or truncated, in which connection the degree of rounding off varies according to the type and size of hole. The length of the tool conforms to the width of the metal strip to be perforated. Tool 13, which is provided with a tooth strip 14 is guided in such a manner that it slides along edge 15 and surface of block 12, which surface extends downward from this edge as clearly shown in Figs. 18 and 19.

In the form of construction as shown by way of example, the tool under the influence of the pressure of the press, is moved vertically downwards, so that the teeth 14 project beyond the edge 15 of block 12. Depending on the size and kind of hole, penetration is more or less deep. In this connection the teeth cut into the metal that lies between tool and block and at the same time displace the metal cut open by the teeth in such a way that opposite the side where the tool penetrated, a cam-like embossment around the resulting hole is formed. During the hole forming process the perforated part of the metal, which is free-swinging projects beyond edge 15, is bent down by the effect of the tool. Figs. 16 and 17 clearly show this process of cutting.

Another development of the invention is shown by Figs. 9 and 10, as well as with different types of teeth shown in Figs. 12, 13, 14 and 15. In connection with this working method the block 12 on edge 15 is also designed with a tooth strip 7. This strip is secured to the block 12. This arrangement is made so that tooth touches tooth when tool 13 moves down under the influence of the pressure. The application of such a double toothed bar affords a double-sided formation of cams, influencing of material distribution when making holes, another possibility of variation in forming the cross-section of the hole and the ridges, and prevents overstraining the material when displacing the material at the moment of perforation. In the example shown in Fig. 12, the teeth of the upper and lower bars are designed alike. According to Fig. 13, the teeth of the lower bar are blunted, whilst according to Fig. 14, they are shaped in the form of a wave line. In Fig. 15 the flanks of the teeth of the lower rack have a different slope from that of the upper rack. The difference of the shape of the teeth depends on the required cross section of the holes, the forms of ridges and the quality of the material employed. In this manner larger holes can also be stamped without tearing the sheet metal.

The novel method disclosed in its broadest aspect comprises the steps of intermittently feeding the sheet of metal 10 over the edge 15 of a stationary block 12 and beneath an upper strip of closely spaced sharp pointed teeth 14 that are end to end offset with respect to the block edge 15, moving the upper strip of teeth 14 downwardly under pressure by the means shown in Figs. 18 and 19 at a stationary position of the sheet 10 to a position where the teeth points overlap the block edge, the extending portion of the sheet 10 swinging under pressure of the tooth strip 14 freely over the edge 15 of the block 12 and forming the small holes of the sieve by said downward movement of the teeth 14 when they overlap the edge 15 of the block 12 at the points to be cut or perforated. The tooth strip 14 is then automatically raised to its initial position above the normal plane of the sheet 10 and then the sheet is fed a step forward and shifted. The free perforated portion of the sheet 10 is always freely swingable over the edge 15 of the block 12 under successive downward pressure movement of the teeth 14 carried by the tool 13.

The same general method is practiced as shown in Figs. 9 and 10, except the block 12 is provided at its forward edge with a tooth strip 7 instead of a flat block edge 15. The tooth strips 7 and 13 are offset in end to end relationship with respect to each other with the lower strip 7 being held stationary in the block 12. The steps of the method are as previously described. In Fig. 11 is illustrated the single tooth strip of this disclosure while Figs. 12, 13, 14 and 15 illustrate the double tooth strip form of the disclosure with difference in form of the teeth in the upper and lower strips.

Although the improved disclosure for manufacturing small hole sieves has been illustrated and described herein to a detailed extent, it will be understood, of course, that the invention is not to be regarded as limited correspondingly in scope, but includes all variations coming within the terms of the appended claims.

I claim:

1. The method of producing small-hole sieves from sheet metal of a diameter up to 1.5 mm., consisting in forming the small holes in closely spaced parallel rows across the metal sheet with axes extending oblique-angled to the plane of the sheet and with camlike beads on one side of the bottom of the sheet by the steps of intermittently feeding the sheet of metal over an edge of a stationary block and beneath an upper strip of closely spaced sharp pointed teeth that are end to end offset with respect to the block edge, moving the upper strip of teeth under pressure downwardly at a stationary position of the sheet to a position where the teeth points slightly overlap the block edge, the extending portion of the sheet swinging under pressure freely over the block edge and forming the small holes of the nature aforesaid by said downward movement of the teeth when they overlap said block edge at the points to be cut, raising the teeth to their initial position above the plane of the sheet, and feeding the metal sheet a step forward after completing of the aforesaid steps, the free perforated portion of the sheet being always freely swingable over the block edge under successive downward pressure movement of the teeth.

2. The method of producing small holes sieves from a sheet of metal up to 1.5 mm., consisting in forming the small holes in closely spaced parallel rows across the metal sheet with axes extending oblique-angled to the plane of the sheet and with camlike beads on one side of the bottom of the sheet by the steps of intermittently feeding the sheet of metal between upper and lower strips of sharp pointed closely spaced teeth that are offset in end to end relationship with respect to each other, the lower teeth strip being stationary, moving the upper strip of teeth under pressure downwardly at a stationary position of the sheet to a position where the teeth points slightly overlap, the extending portion of the sheet from the stationary lower strip of teeth swinging under pressure freely over the stationary lower teeth strip and forming the small holes of the nature aforesaid by said downward movement of the upper strip of teeth when they overlap the lower strip of teeth at the points to be cut, raising the upper strip of teeth to their initial position above the plane of the sheet, and feeding the metal sheet a step forward after completion of the aforesaid steps, the free perforated portion of the sheet being always freely swingable over the edge of the lower strip of teeth under successive downward pressure movement of the upper strip of teeth.

3. The method according to claim 2 in which the form of the teeth of the upper strip differs from the form of the teeth of the lower strip.

References Cited in the file of this patent

UNITED STATES PATENTS

| | | |
|---|---|---|
| Re. 19,477 | Dixon et al. | Feb. 26, 1935 |
| 594,172 | Duncan et al. | Nov. 23, 1897 |
| 1,514,229 | Redding | Nov. 4, 1924 |
| 1,913,357 | Ball | June 13, 1933 |
| 1,979,748 | Kimmel | Nov. 6, 1934 |
| 2,255,894 | Ormond | Sept. 16, 1941 |